(12) United States Patent  
Tucker

(10) Patent No.: US 9,759,429 B2  
(45) Date of Patent: Sep. 12, 2017

(54) PELLET GRILL

(71) Applicant: Mak Grills, LLC, Dallas, OR (US)

(72) Inventor: Robert Tucker, Dallas, OR (US)

(73) Assignee: MAK Grills, LLC, Dallas, OR (US)

( * ) Notice: Subject to any disclaimer, the term of this patent is extended or adjusted under 35 U.S.C. 154(b) by 618 days.

(21) Appl. No.: 14/271,362

(22) Filed: May 6, 2014

(65) Prior Publication Data

US 2015/0320259 A1 Nov. 12, 2015

(51) Int. Cl.
*F24B 3/00* (2006.01)
*F24B 13/04* (2006.01)
*A47J 37/07* (2006.01)
*F24B 5/08* (2006.01)

(52) U.S. Cl.
CPC ........... *F24B 13/04* (2013.01); *A47J 37/0704* (2013.01); *A47J 37/0786* (2013.01); *F24B 5/08* (2013.01)

(58) Field of Classification Search
CPC .......... F24B 13/00; F24B 13/02; F24B 13/04; F24B 1/003; F24B 1/024; F24B 1/22; F24C 7/02; F23B 50/12
See application file for complete search history.

(56) References Cited

U.S. PATENT DOCUMENTS

| | | | |
|---|---|---|---|
| 3,448,679 A | 6/1969 | Holka et al. | |
| 5,429,110 A * | 7/1995 | Burke | A47J 37/0704 110/110 |
| 6,257,227 B1 | 7/2001 | Harbin | |
| 7,168,363 B1 | 1/2007 | Brown | |
| 8,297,271 B2 | 10/2012 | Cedar et al. | |
| 2003/0015188 A1 | 1/2003 | Harbin | |
| 2004/0182254 A1 | 9/2004 | Gershon | |
| 2005/0034716 A1 | 2/2005 | Harbin | |
| 2007/0056577 A1 | 3/2007 | Chang | |
| 2007/0137537 A1 | 6/2007 | Drisdelle et al. | |
| 2007/0221205 A1 * | 9/2007 | Landon | F23B 50/12 126/502 |
| 2009/0000493 A1 | 1/2009 | Mosher, II | |
| 2010/0012165 A1 * | 1/2010 | Bedard | A47J 37/0786 136/205 |
| 2010/0251973 A1 * | 10/2010 | Dongo | F23B 40/08 122/14.1 |
| 2012/0060819 A1 | 3/2012 | Hunt et al. | |

OTHER PUBLICATIONS

Custom Thermoelectric, "Power Generator (Seebeck) Module Installation," 2010, pp. 1-6.

* cited by examiner

*Primary Examiner* — Jason Lau
(74) *Attorney, Agent, or Firm* — Klarquist Sparkman, LLP

(57) ABSTRACT

An automated self-contained pellet grill includes a base housing that defines a heat distribution chamber with a cooking grid supported in an opening at the top of the base for supporting food to be cooked. A pellet burning mechanism, located within the housing, includes a pellet feeder driven by an electrical motor. Electrical power is provided for the motor by a thermoelectric generator having a hot side that is heated by burning pellets and a cold side that is cooled by flowing ambient air.

19 Claims, 3 Drawing Sheets

PELLET GRILL

BACKGROUND

The present invention concerns cooking grills that operate by burning pelletized fuel that is supplied to a burn chamber by an electrically operated conveyor.

Barbecue grills that burn pelletized fuel, commonly referred to as "pellet grills," have an advantage over other types of barbecue grills in that pellet grills can be operated for an extended period of time and at a low temperature, which cooking at low temperature is referred to as "smoking."

Pellet grills may include a mechanical pellet feed mechanism to convey fuel pellets from a hopper into a fire pot at the bottom of the grill. An advantageous feed mechanism includes an electrically powered auger that is controlled by a thermostat. Some pellet grills include an electric igniter rod to ignite the pellets. The fuel pellets typically are made of compressed hardwood sawdust.

The usefulness of automated pellet grills has been limited in that connection to the electrical grid has been needed to provide sufficient electrical power to operate a motor that drives a mechanical pellet feed mechanism. Automated pellet grills therefore are not well suited for use in remote locations.

SUMMARY

Described herein is an automated pellet grill that is completely self-contained and does not require connection to the electrical grid.

The grill includes a base housing that defines a heat distribution chamber with a cooking grid supported in an opening at the top of the base for supporting food to be cooked. A pellet burning mechanism, located in the housing, includes a pellet feeder driven by an electrical motor. Electrical power is generated by a thermoelectric generator that has a hot side that is heated by burning pellets and a cold side that is cooled by flowing ambient air.

Features and advantages of the invention will become more apparent from the following detailed description, which proceeds with reference to the accompanying figures.

DETAILED DESCRIPTION

Figure 1:
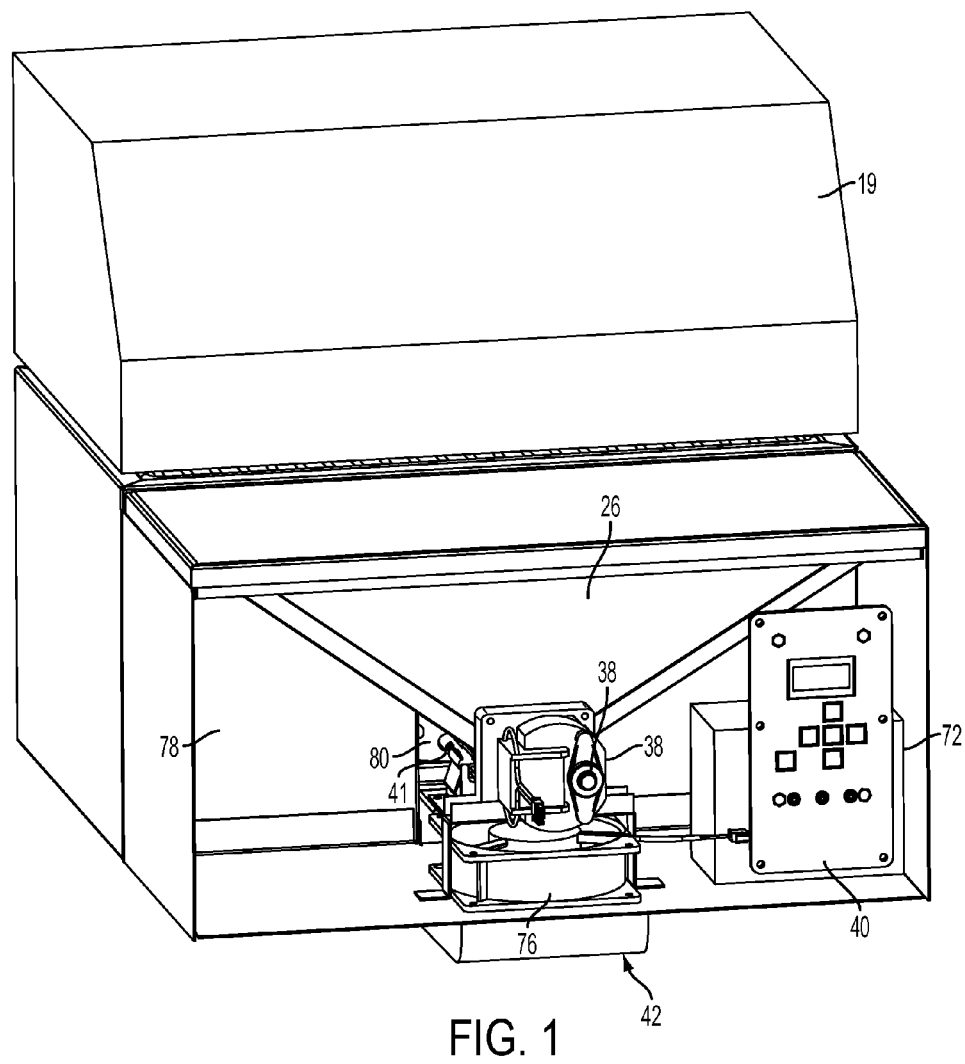
FIG. 1 is an oblique view of a pellet grill with a rear panel removed to show internal detail.

The drawings illustrate a pellet fuel grill having a box-like base housing 10. The housing 10 has a wall 12. The illustrated wall 12 has a generally horizontally extending bottom portion and generally vertically extending side portions that together define a heat distribution chamber 16. An opening 14 is provided at the top of the base 10. A cooking grid 18 is supported in the opening 14. An openable lid 19 is located above the grid 18 to provide an enclosed volume of heated gas above the grid when the grill is in operation. A fire pot 20 is located inside the heat distribution chamber 16. The fire pot defines a burn chamber 22 that is in communication with the heat distribution chamber 16 such that heated gas can travel from the burn chamber into the heat distribution chamber and up to the cooking grid 18. The fire pot includes a perforated side wall that partially defines the burn chamber 22.

Heat is generated by the burning of fuel pellets. A bin 24 defines a pellet storage chamber 26. A pellet feeder 28 is in communication with the bin 24. Pellets that are received by the pellet feeder 28 from the bin 24 are conveyed to the burn chamber 22 by the pellet feeder. The illustrated pellet feeder 28 is an auger conveyor that includes an auger tube 30 having an inlet 32 in communication with the pellet storage chamber 26 and an outlet 34 in communication with the burn chamber 22. A rotatable auger 36 is located inside the auger tube 30. An electrical motor 38 is drivingly connected to the auger 36 to rotate the auger, which moves pellets toward the burn chamber 22. A controller 40 is connected to the motor to regulate operation of the motor. The illustrated controller 40 regulates both the motor 31 and other electrical components of the grill. An electrical igniter rod 41 extends into the burn chamber 22 and is operable to ignite fuel pellets located in the burn chamber.

An air intake duct 42 is provided below the base housing 10. The duct 42 has an air inlet 44 that is in communication with ambient air surrounding the grill. The duct 42 also has an air outlet 46 that is in communication with the burn chamber 22, so that air passing through the air outlet supplies oxygen for combustion inside the burn chamber. At least a portion 50 of the air intake duct 42 extends alongside or through the base housing 10 at a location where heat inside the heat distribution chamber 16 will transfer to air inside the air intake passageway 48. The illustrated pellet fuel grill has an air intake passageway 48 that is located outside the heat distribution chamber 16. A portion of the air intake duct 42 comprises a portion of the wall 12 of the heat distribution chamber 16 such that the base housing 10 and the air intake duct 42 have a common wall portion 50. The illustrated duct 42 and a bottom portion of the wall 12 of the base housing 10 together define the air intake passageway 48 that extends between the air inlet 44 and the air outlet 46. The illustrated firepot 20 is positioned adjacent the air intake duct 42 to facilitate the transfer a portion of the heat generated by combustion in the firepot into air inside the air intake passageway 48.

A thermoelectric generator 62 is provided to produce electrical energy. The thermoelectric generator 62 is electrically connected to the electrical motor 38 to supply electrical current to operate the electrical motor 38, and may be used to provide power for other electrical components and particularly for battery charging.

The thermoelectric generator 62 has a hot side 64 that faces the heat distribution chamber 16 and a cold side 66 that faces the air intake passageway 48. In the illustrated grill, the hot side 64 of the thermoelectric generator 62 faces and is in contact with an extender block 65 made of a heat conductive material, such as aluminum. The extender block 65 also is in direct contact with the fire pot 20 to transfer heat from the burn chamber 22 to the hot side 64 of the thermoelectric generator 62. In particular, in the illustrated embodiment, the extender block 65 serves as the floor of the firepot 20. As an alternative, the hot side 64 of the thermoelectric generator 62 could be positioned to contact heated gas located inside the heat distribution chamber 16 or to contact an exterior surface of the wall 12 of the base housing 10. The cold side 66 of the thermoelectric generator can be positioned to contact air inside the air intake passageway 48. In the illustrated grill, the common wall portion 50 defines an opening 67, with the thermoelectric generator being located within the opening. A heat sink 68 is physically and thermally connected to the cold side 66 to cool the cold side. At least a portion of the heat sink 68 extends into the air intake passageway 48 to contact air that flows through the passageway. In the illustrated grill, the entire heat sink 68 is located in the passageway 48.

Figure 3:
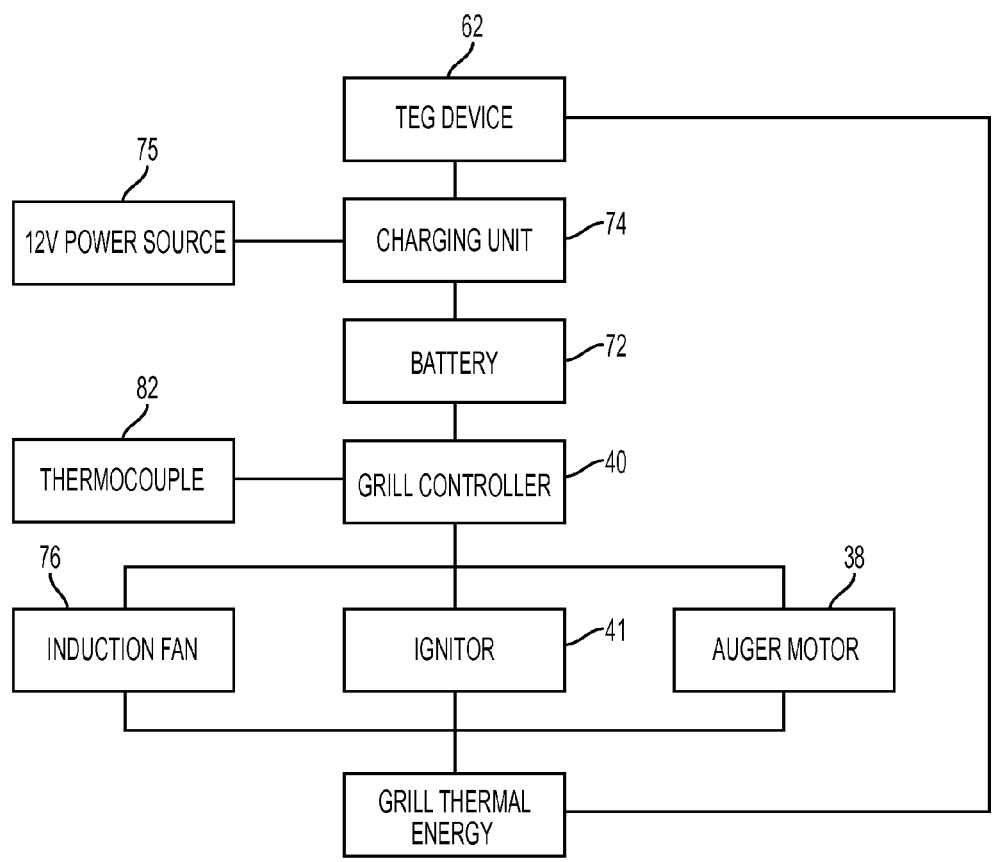
FIG. 3 is a schematic diagram of an electrical system for the pellet grill of FIG. 1.

As shown in FIG. 3, the illustrated controller 40 is electrically connected to the thermoelectric generator 62 and to the electrical motor 38 to regulate operation of the motor. The illustrated electrical system also includes a rechargeable battery 72 that is electrically connected to the electrical motor 38 to supply electrical current to the electrical motor as directed by the controller 40. A charging unit 74 is electrically connected to the battery for charging the battery 72 and is electrically connected to the thermoelectric generator 62 to receive electrical energy for charging the battery. An auxiliary power source 75, such as a 12V DC transformer that can interface with and receive power from a 110V AC or 220V AC electrical power source, may be used to charge the battery 72 when the thermoelectric generator 62 provides insufficient power to charge the battery.

The illustrated grill also includes an air circulation apparatus that is configured to urge air to move through the air intake duct 42 from the air inlet 44 to the air outlet 46. In particular, an induction fan assembly 76 includes an air circulation motor drivingly connected to a blade fan. The air circulation motor is electrically connected to the battery 72 and/or thermoelectric generator 62 via the controller 40, which regulates operation of the induction fan assembly 76. Best results are achieved with an electrical system having 12V DC components.

Food can be cooked or smoked by burning pellet fuel in the burn chamber 22 and positioning food on the cooking grid or positioned elsewhere inside or above the heat distribution chamber 16, such as in the space defined by the lid 19 when closed, where the food is exposed to heat generated by the burning of the pellet fuel. The pellet fuel is ignited, whereupon the resulting heated combustion gas moves upwardly to and through the grid 18 and through or along any other locations where food is supported for cooking.

The battery 72 provides electrical energy to initiate operation of the electrical components of the grill and can continue to provide power during a cooking session. To provide an extended cooking period, the pellet feeder 28 is operated to feed pellet fuel from the pellet storage chamber 26 to the burn chamber 22 by supplying electrical current to the motor 38. Once pellets are burning in the fire pot 20, a temperature differential is established such that electrical current is generated by the thermoelectric generator 62. Current from the thermoelectric generator 62 can be used to recharge the battery, supply power directly to electrical motors, or both.

The hot side 64 of the thermoelectric generator 62 is located in proximity to the burn chamber 22, where temperature is the highest. The cold side 66 is positioned to be cooled by ambient air that is conveyed into and through the air intake passageway 48 such that a temperature differential is maintained between the hot side 64 and the cold side 66. More particularly, air is conveyed through the passageway 48 by convection and/or by operation of the induction fan assembly 76. Ambient air that enters and passes through the passageway 48 contacts and cools the heat sink 68 which reduces the temperature of the cold side 66 of the thermoelectric generator 62. For proper operation of the thermoelectric generator 62, sufficient air circulation should be maintained to keep the cold side 66 from being heated to a temperature that exceeds 160° C.

Figure 2:
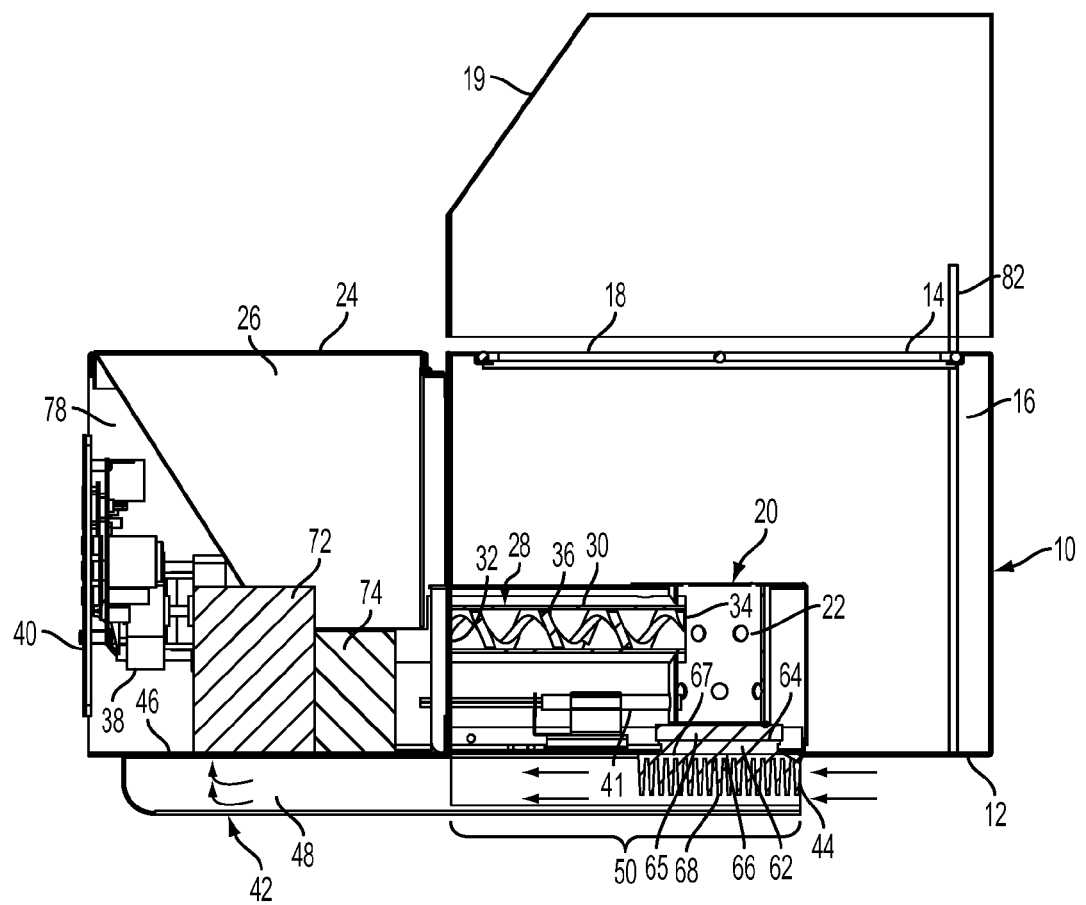
FIG. 2 is side elevational view of the pellet grill of FIG. 1 with portions cut away to show internal detail.

As it moves through the passageway 48, air is heated as it comes into contact with the heat sink 68. The air is further heated, as it continues to pass through the region of the common wall portion 50, by heat that transfers through common wall portion from the heat distribution chamber 16 to the passageway 48. Preheated air exits the passageway 48 via the air outlet 46, passes through the induction fan assembly 76, and moves into a plenum space 78 that is located in the compartment that contains the bin 24 as shown in FIGS. 1-2. Preheated air then moves from the plenum space 78 into the heat distribution chamber 16 via an opening 80 in a wall that separates the plenum space from the heat distribution chamber. Once inside the heat distribution chamber 16, a portion of the stream of preheated air from the air intake duct 42 enters the burn chamber 22 to sustain combustion. The air intake duct 42 thus acts as preheater for air entering the burn chamber 22.

The temperature of influent ambient air can vary considerably due to variations in atmospheric conditions. Preheating is advantageous to provide combustion air at substantially consistent temperature, regardless of the temperature of ambient air entering the pellet grill.

The controller 40 is connected to a thermocouple 82, which signals temperature in the heat distribution chamber 16 to the controller. Responsive to the received temperature information, the controller adjusts operation of the fuel feed motor 38, igniter 41, and fan motor 76 to maintain the gas in the heat distribution chamber 16 within a desired temperature range. The controller 40 may a programmable device that operates to vary the temperature with the passage of time, according to a programmed temperature profile, to optimize the cooking of a particular type of food. The controller 40 may include controls for manual adjustment by a user. The controller 40 also may include a communication device to exchange data wirelessly with a remote control device. Advantageously, the communication device can be an RF transponder that employs the Bluetooth® standard and/or the Wi-Fi® standard for remote communication. The communication device may include an interface with a computer network so the remote control device can be located at a great distance from the grill. The remote control device can be a computer terminal or a handheld device, such as a smart phone or tablet computer.

In view of the many possible embodiments to which the principles of the disclosed invention may be applied, it should be recognized that the illustrated embodiments are only preferred examples of the invention and should not be taken as limiting the scope of the invention. For example, although the thermoelectric generator is described as being at a location that is particularly advantageous, a thermoelectric generator could be positioned elsewhere in the grill, such as on or in an opening through a wall that separates the heat distribution chamber from the plenum space, with hot side of the thermoelectric generator facing the heat distribution chamber and the cold side facing the plenum space. Multiple thermoelectric generators could be provided in the grill to enhance the production of electricity. The scope of the invention therefore is defined by the following claims.

The invention claimed is:
1. A pellet fuel grill comprising:
a base having a wall that defines an opening at the top of the base and that defines a heat distribution chamber;
a cooking grid for supporting food to be cooked, the grid being supported in the opening at the top of the base;

a fire pot located inside the heat distribution chamber, the fire pot defining a burn chamber that is in communication with the heat distribution chamber such that gas can travel from the burn chamber into the heat distribution chamber;

a bin that defines a pellet storage chamber;

a pellet feeder for conveying pellet fuel from the pellet storage chamber to the burn chamber;

an electrical motor drivingly connected to the pellet feeder;

an air intake duct that defines (a) an air inlet in communication with ambient air, (b) an air outlet in communication with the burn chamber, and (c) an air intake passageway extending between the air inlet and the air outlet, at least a portion of the air intake duct extending alongside the bottom of the base at a location where heat inside the heat distribution chamber will transfer to air inside the air intake passageway at a location that is upstream of the location where the air is received by the burn chamber;

a thermoelectric generator having a hot side that faces the heat distribution chamber and a cold side that faces the air intake passageway, the thermoelectric generator being electrically connected to the electrical motor to supply electrical current to the electrical motor; and a controller that is connected to the motor to regulate operation of the motor.

2. The pellet fuel grill of claim 1 wherein the hot side of the thermoelectric generator is positioned to contact gas located inside the heat distribution chamber.

3. The pellet fuel grill of claim 1 wherein the hot side of the thermoelectric generator is thermally connected to the fire pot.

4. The pellet fuel grill of claim 1 wherein the cold side of the thermoelectric generator is positioned to contact gas located inside the air intake passageway.

5. The pellet fuel grill of claim 1 further comprising a heat sink that is positioned to contact air inside the air intake passageway and that is thermally connected to the cold side of the thermoelectric generator.

6. The pellet fuel grill of claim 5 wherein at least a portion of the heat sink is located inside the air intake passageway.

7. The pellet fuel grill of claim 1 wherein the firepot is positioned adjacent the air intake duct at such a location that heat will transfer from the firepot into air inside the air intake passageway.

8. The pellet fuel grill of claim 1 wherein:
the air intake passageway is located outside the heat distribution chamber; and
a portion of the air intake duct comprises a portion of the wall of the heat distribution chamber such that the base and the air intake duct have a common wall portion.

9. The pellet fuel grill of claim 8 wherein:
the common wall portion defines an opening; and
the thermoelectric generator is located within the opening.

10. The pellet fuel grill of claim 1 wherein:
the pellet feeder comprises (a) an auger tube having an inlet in communication with the pellet storage chamber and an outlet in communication with the burn chamber, and (b) a rotatable auger located within said auger tube; and
the electrical motor is drivingly connected to the auger to rotate the auger.

11. The pellet fuel grill of claim 1 wherein the controller is electrically connected to the thermoelectric generator and to the electrical motor to regulate operation of the motor.

12. The pellet fuel grill of claim 1 wherein the base is a box-like structure.

13. The pellet fuel grill of claim 1 wherein the thermoelectric generator is electrically connected to the electrical motor via:
a battery that is electrically connected to the electrical motor to supply electrical current to the electrical motor; and
a charging unit that is electrically connected to the battery for charging the battery and that is electrically connected to the thermoelectric generator to receive electrical current from the thermoelectric generator for charging the battery.

14. The pellet fuel grill of claim 1 further comprising:
an air circulation apparatus configured to urge air to move through the air intake duct from the air inlet to the air outlet; and
an air circulation motor drivingly connected to the air circulation apparatus, the air circulation motor being an electrical motor electrically connected to the thermoelectric generator to supply electrical current to the air circulation motor.

15. A method for cooking food comprising:
providing a pellet fuel grill comprising a base having a wall that defines an opening at the top of the base and that defines a heat distribution chamber, a cooking grid for supporting food to be cooked, the grid being supported in the opening at the top of the base, a fire pot located inside the heat distribution chamber, the fire pot defining a burn chamber that is in communication with the heat distribution chamber such that gas can travel from the burn chamber into the heat distribution chamber, a bin that defines a pellet storage chamber, a pellet feeder for conveying pellet fuel from the pellet storage chamber to the burn chamber, an electrical motor drivingly connected to the pellet feeder, an air intake duct that defines (a) an air inlet in communication with ambient air, (b) an air outlet in communication with the fire pot, and (c) an air intake passageway extending between the air inlet and the air outlet, at least a portion of the air intake duct extending alongside the bottom of the base at a location where heat inside the heat distribution chamber will transfer to air inside the air intake passageway, a thermoelectric generator having a hot side that faces the heat distribution chamber and a cold side that faces the air intake passageway, the thermoelectric generator being electrically connected to the electrical motor to supply electrical current to the electrical motor, and a controller that is connected to the motor to regulate operation of the motor;
burning pellet fuel in the burn chamber, which heats the hot side of the thermoelectric generator;
conveying ambient air through the intake passageway in such a path that (a) the ambient air in the intake passageway cools the cold side of the thermoelectric generator and maintains a temperature differential between the hot side and the cold side thereby generating electrical current and (b) the ambient air in the intake passageway is heated by heat received from the heat distribution chamber to provide heated air in the intake passageway;
conveying the heated air from the intake passageway to the burn chamber via the air outlet;
operating the pellet feeder to feed pellet fuel from the pellet storage chamber to the burn chamber by supplying electrical current to the motor; and positioning food on the cooking grid where the food is exposed to heat generated by the burning of the pellet fuel.

16. The pellet fuel grill of claim 1 wherein:
the hot side of the thermoelectric generator is positioned to contact gas located inside the heat distribution chamber;
the hot side of the thermoelectric generator is thermally connected to the fire pot;
the cold side of the thermoelectric generator is positioned to contact gas located inside the air intake passageway; and
the firepot is positioned adjacent the air intake duct at such a location that heat will transfer from the firepot into air inside the air intake passageway.

17. The pellet fuel grill of claim 1 wherein:
the hot side of the thermoelectric generator is positioned to contact gas located inside the heat distribution chamber;
the hot side of the thermoelectric generator is thermally connected to the fire pot;
the cold side of the thermoelectric generator is positioned to contact gas located inside the air intake passageway;
the firepot is positioned adjacent the air intake duct at such a location that heat will transfer from the firepot into air inside the air intake passageway;
the air intake passageway is located outside the heat distribution chamber;
a portion of the air intake duct comprises a portion of the wall of the heat distribution chamber such that the base and the air intake duct have a common wall portion;
the common wall portion defines an opening;
the thermoelectric generator is located within the opening.

18. The pellet fuel grill of claim 1 further comprising:
a battery that is electrically connected to the electrical motor to supply electrical current to the electrical motor;
a charging unit that is electrically connected to the battery for charging the battery and that is electrically connected to the thermoelectric generator to receive electrical current from the thermoelectric generator for charging the battery;
an air circulation apparatus configured to urge air to move through the air intake duct from the air inlet to the air outlet; and
an air circulation motor drivingly connected to the air circulation apparatus, the air circulation motor being an electrical motor electrically connected to the thermoelectric generator to supply electrical current to the air circulation motor.

19. The pellet fuel grill of claim 1 wherein:
the hot side of the thermoelectric generator is positioned to contact gas located inside the heat distribution chamber;
the hot side of the thermoelectric generator is thermally connected to the fire pot;
the cold side of the thermoelectric generator is positioned to contact gas located inside the air intake passageway;
the firepot is positioned adjacent the air intake duct at such a location that heat will transfer from the firepot into air inside the air intake passageway;
the air intake passageway is located outside the heat distribution chamber;
a portion of the air intake duct comprises a portion of the wall of the heat distribution chamber such that the base and the air intake duct have a common wall portion;
the common wall portion defines an opening;
the thermoelectric generator is located within the opening;
the thermoelectric generator is electrically connected to the electrical motor via a battery that is electrically connected to the electrical motor to supply electrical current to the electrical motor and a charging unit that is electrically connected to the battery for charging the battery and that is electrically connected to the thermoelectric generator to receive electrical current from the thermoelectric generator for charging the battery;
the pellet fuel grill further comprises an air circulation apparatus configured to urge air to move through the air intake duct from the air inlet to the air outlet; and
the pellet fuel grill further comprises an air circulation motor drivingly connected to the air circulation apparatus, the air circulation motor being an electrical motor electrically connected to the thermoelectric generator to supply electrical current to the air circulation motor.

* * * * *